Figure 1:
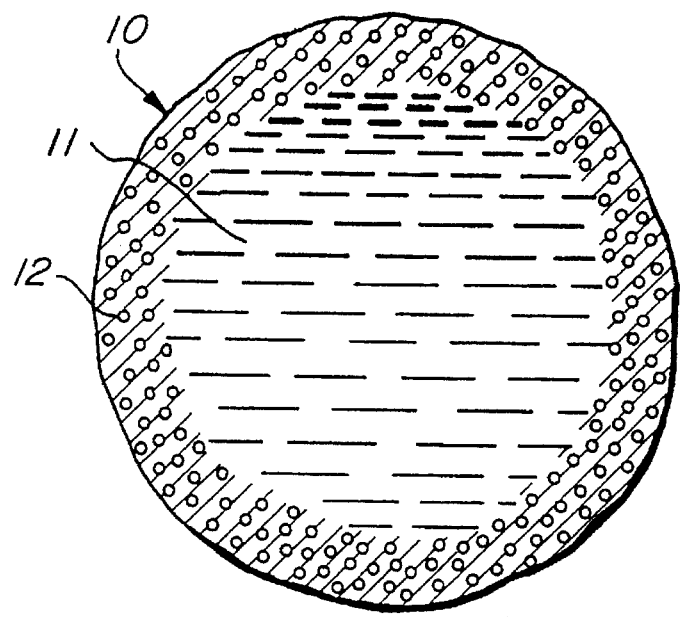
Figure 2:
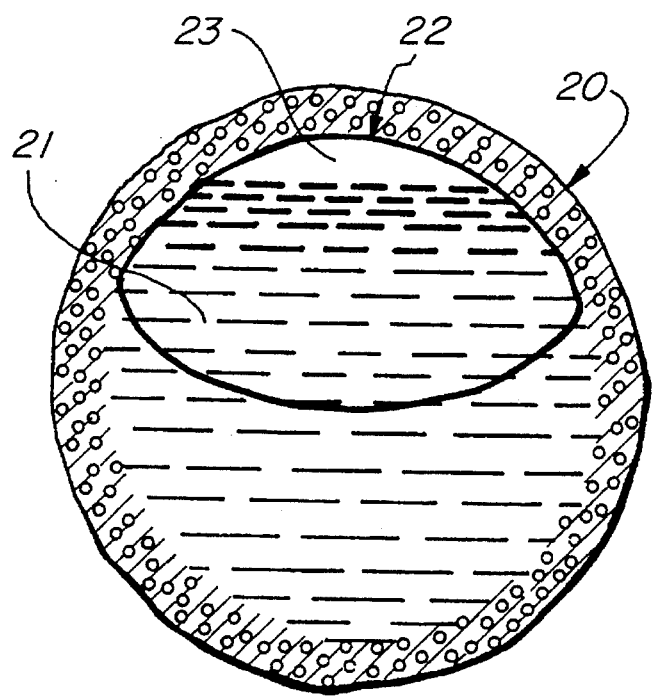

United States Patent
Dobry

[11] Patent Number: 5,560,856
[45] Date of Patent: Oct. 1, 1996

[54] PARTICULATE AGENTS FOR DRY HEAT APPLICATION

[76] Inventor: Reuven Dobry, 87 Rolling Wood Dr., Stamford, Conn. 06905-2331

[21] Appl. No.: 333,281

[22] Filed: Nov. 2, 1994

[51] Int. Cl.$^6$ .......................................... C09K 3/00
[52] U.S. Cl. ................... 252/70; 252/74; 252/71; 252/73; 428/321.5; 428/320.2; 165/10; 62/530
[58] Field of Search ................. 252/70, 71, 73, 252/74; 428/321.5, 320.2; 165/10; 62/530

[56] References Cited

U.S. PATENT DOCUMENTS

| | | | |
|---|---|---|---|
| 4,937,412 | 6/1990 | Dobry | 219/10.55 M |
| 5,282,994 | 2/1994 | Salyer | 252/70 |
| 5,290,904 | 3/1994 | Colvin et al. | 428/68 |
| 5,314,005 | 5/1994 | Dobry | 165/10 |

Primary Examiner—Melissa Bonner

[57] ABSTRACT

Particulate agents of this invention typically consist of a hydrophobic, microwave transparent liquid contained in a microwave responsive substrate. Liquid and substrate are selected to be substantially free of attendant moisture. The liquid is readily absorbed into its substrate and retained therein by capillary forces. Aggregates of such particulate agents preheated by microwave energy contain stored dry heat which is transferrable to load objects. The particulate agents may be formulated to provide a desirable fragrance along with the delivery of heat.

6 Claims, 2 Drawing Sheets

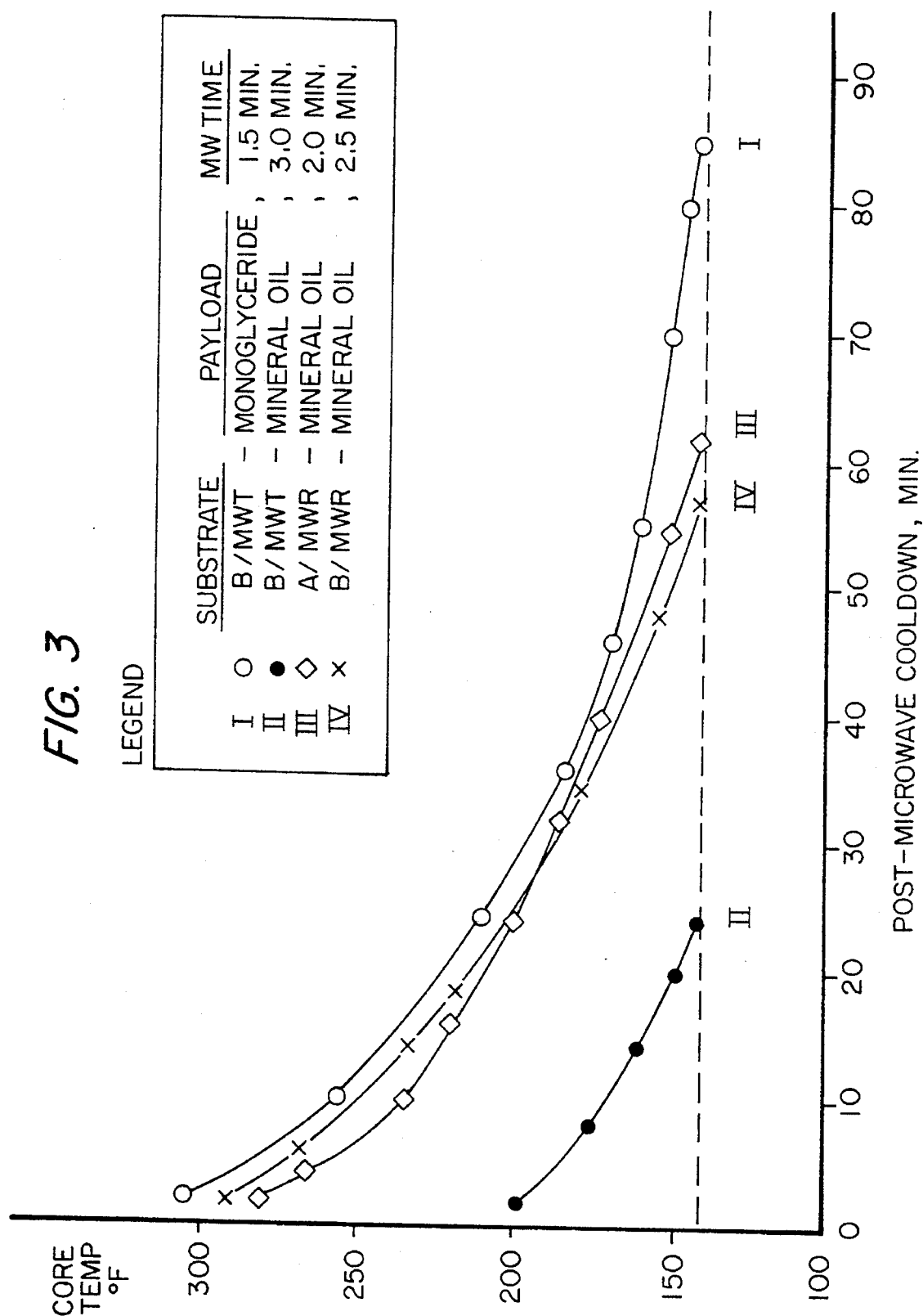

PARTICULATE AGENTS FOR DRY HEAT APPLICATION

BACKGROUND OF THE INVENTION

1. Technical Field

This invention concerns materials which can serve as intermediate agents for transfer of heat from an energy source to a load object. More specifically, it relates to particulate compositions of matter which can be used effectively for heating or cooling applications.

In a typical heating application, agent B receives heat from source A and delivers its heat to load object C. The same applies, in principle, to a cooling application. In that case, agent B receives cold from (gives up its heat to) source A and gives up its cold to (receives heat from) load object C. In other words, one may consider the load object of cold as a source of heat and the source of cold as the load object of heat. Thus, intermediate agents play a similar role in heating and cooling.

2. Description of the Prior Art

Examples of common heating and cooling applications come to mind quite readily. Electric corn poppers or hair dryers use air as the intermediate heating agent. Pressing irons or frying pans use metal as the intermediate heating agents. Hot oil is used as an intermediate heating agent in deep frying and water is used as the primary intermediate heating agent in most cooking applications. Turning to a common example of cooling, air is the primary cooling intermediate in a refrigerator. All of the above are instances of dynamic, steady-state heat transfer, where the intermediate agents receive and discharge heat concurrently, either intermittently or continuously. Under these conditions, the agents' ability to transfer heat is of primary importance.

In other situations, the process of heat transfer is sequential rather than concurrent. In such cases, an intermediate heating (cooling) agent receives heat (cold) for later use and then delivers it to a load object, likely at another location away from the original source. Sequential heating is exemplified by preheated water in a jacketed baby feeding dish or in a hot water bottle. A freezer pack is an example of stored cold. It is clear that in sequential heating/cooling applications the intermediate agents' ability to store heat is an important attribute. Measures of capacity to store heat for materials which do not undergo a change of state relate to specific heat per unit weight and, in combination with density, specific heat per unit volume. Changes of state will be considered later.

One other attribute worthy of mention is fluidity; i.e. the agents' ability to flow readily and surround the load object, thereby delivering heat to more than one surface. It can, and often does, play an important role in concurrent as well as sequential schemes of heat transfer, as will become more evident in the discussion which follows.

Against this background, one can assess the ability of various materials, in their respective physical states, to act as intermediate heat transfer agents.

GASES

Air and combustion gases are readily available, and their fluidity is clearly an advantage. They are well-suited for heating applications, but relatively slow and energy wasteful, unless the rate of heat transfer to load objects is enhanced by convection. The low specific heat and low density of gases limit their usefulness as agents for storage of heat, except where massive volumes of gas can effectively be employed. The same generally applies to cooling.

SOLIDS

Metals are effective agents for transfer of heat by virtue of their high conductivity. However, low specific heat (approx. 0.1 cal/g° C.) and high density make them relatively poor agents for storage of heat, except when substantial mass can be brought into play. Inorganic, mineral-type solids are poor thermal conductors, largely unsuitable for heat transfer. Their moderate specific heat (0.2–0.3 cal/g° C.) is not sufficient for storage of heat and cold. Moreover, lacking fluidity, their mode of heat transfer is characteristically unidirectional and most effective via immediate contact.

LIQUIDS

Because of their physical attributes, liquids are uniquely suited for most heating and cooling applications. They possess fluidity and ability to transmit heat by conduction as well as convection. Moreover, their medium density (0.8–1.2 g/cc) and high specific heat (0.5–1.0 cal/g ° C.) make them ideal for storage of heat in sequential processes. A common liquid such as water can also exist in other states, thereby extending its effective range of operating temperatures. Water can exist as steam for heating applications, with the full benefit of fluidity. It also can exist as ice for cooling applications, albeit at the expense of fluidity. Changes of state enhance the ability of water to store and carry heat by virtue of the latent heat of condensing steam (for heating) and melting ice (for cooling), over and above what is available via sensible heat solely in the liquid state.

Focusing our attention on sequential heating scenarios; i.e. those involving transfer of stored heat from a source to a load object, liquids would clearly seem to be the preferred choice. However, liquids are not the panacea for all heating/cooling applications. Many common liquids, water included, cannot serve as permanent and reusable intermediate agents, because they are volatile, subject to loss by evaporation and therefore in need of frequent replacement. Volatile liquids also risk pressure build-up when heated in hermetically sealed containers. Non-volatile liquids are, of course, safer. However, volatile or not, liquids must be effectively contained, secure against leakage as a result of physical or thermal damage to materials which contain them. In any case, liquids are not suitable agents for "dry" heat applications; i.e. where direct contact with such liquids is to be avoided.

Particulate heating/cooling agents, described in U.S. Pat. Nos. 4,937,412 and 5,314,005, combine liquids with solids. The resulting compositions possess physical properties which are intermediate between those of pure solids and those of pure liquids, but with fewer of the drawbacks aforementioned for either. The particulates in question employ porous substrates as carriers for payloads consisting primarily of non-volatile liquids. The payloads are intended to increase the specific heat or heat storing capacity of the particles. They also provide the means for preheating the particles in a microwave oven, since most commonly available substrates are relatively microwave transparent. To achieve that, the liquid must be microwave responsive.

The particulate compositions made according to the state of the art then existing were considered to be uniquely suited for healthcare applications. Heating/cooling pads comprising such particulate matter in fabric bags were claimed to have many advantages, among them:

a. Ability to deliver dry heat or moist heat, by specific choices of the liquid component.

b. Automatic recovery of moist heat capability from ambient air; i.e. without need for deliberate resupply of water to replenish moisture given up.

c. Fast preheat and reheat by microwave energy rather than conventional methods.

d. Repeated usage with minimal handling and preparation.

e. Dual functionality in one product; heat or cold.

f. Benefits from the desirable properties of liquids, such as higher specific heat, without risk of leakage or drippy mess.

g. Good draping properties even at low temperatures; i.e., never freezable to a solid mass.

h. Safer, gradual delivery of heat or cold, characteristic of heat transfer through beds of solids.

Substrates employed by the prior art for particulate agents, typically catalyst carriers made of activated alumina and the like, are well suited for moist heat applications. They are highly adsorptive to moisture and readily compatible with hydrophilic liquid payloads. In a sense, they may be considered as hydrophilic themselves. That gives them the facility to deliver moisture, along with heat, and reabsorb moisture from ambient sources upon cooldown.

Unfortunately, difficulties arise when, for dry heat applications, it is necessary to load the same substrates with hydrophobic payloads. Examples of the latter include acetylated monoglycerides, monoglycerides, edible fats and oils, paraffins, paraffin oils and mineral oils. Commonly available substrates are slow to absorb such payloads, because the latter must work against ever-present moisture as well as the properties of the substrate which are inherently hydrophilic. In some cases, moisture practically blocks the absorption of hydrophobic payloads. In others, rising levels of moisture actually cause the partial expulsion of a payload after it is fully absorbed into a dry substrate. In yet another instance, the presence of moisture accelerates the hydrolysis of acetylated monoglycerides, to form free acetic acid. For any and all of the reasons above, it is advisable to painstakingly shield such "dry heat" particulates from ambient moisture to minimize the presence of moisture in the particles, thereby precluding its delivery with the application of heat.

Other problems arise with the formulation of dry heat particulates, as direct extensions of moist heat applications. Hydrophilic payloads are highly microwave responsive, even more so in combination with water. Particulate agents containing such payloads depend on that microwave responsiveness for their preheating, since most commonly available substrates are relatively microwave transparent. Microwave responsive payloads are so dominant in that regard that the microwave responsiveness of the substrate, if any exists, contributes little to the microwave susceptibility of the particle as a whole.

The aforementioned scenario changes markedly, however, for dry heat applications. As payloads change from hydrophilic to hydrophobic properties they also tend to lose their microwave responsiveness. In the extreme, paraffins, paraffin oils or mineral oils are examples of payloads which are virtually microwave transparent. Under those circumstances the microwave responsiveness of the substrate becomes all-important. Commonly available substrates carrying such payloads are essentially microwave transparent. Therefore, microwave responsiveness can only be restored by coupling microwave transparent payloads with microwave responsive substrates.

In summary then, it is clear that particulate agents intended for dry heat application require substrates which are:

1. Minimally attractive to moisture

2. Readily absorptive to hydrophobic payloads

3. Microwave responsive, for accommodating payloads which are inherently microwave transparent Further development of this technology has recently addressed each and every one of the above requirements. Accordingly, the object of this invention is to provide the practitioner with alternate particulate compositions which extend well beyond the prior art. More specifically, a further object of the invention is to suggest particulates with compositions better suited for dry heat applications.

SUMMARY OF THE INVENTION

The present invention identifies particulate compositions of matter which are better suited for the delivery of dry heat. The particles consist of non-volatile, microwave transparent, hydrophobic substances which are contained in macroporous, microwave responsive, solid substrates. The substances are readily absorbed into their carriers and held therein by capillary forces. They are carefully selected to be compatible with each other and substantially free of attendant moisture. Aggregrates of such particles, suitably contained, may be preheated by microwave energy. Heat stored therein is available for delivery by close proximity of the particles to load objects. The delivery of heat may be accompanied by a desirable fragrance.

BRIEF DESCRIPTION OF THE DRAWINGS

The present invention is illustrated in the accompanying drawings of which:

FIG. 1 is a sectional view of a particle with uniform porosity containing absorbed liquid;

FIG. 2 is a sectional view of a particle with a well defined, enlarged cavity similarly containing absorbed liquid; and FIG. 3 is a graphic presentation, comparing the thermal performance of various particulate compositions.

DESCRIPTION OF THE PREFERRED EMBODIMENTS

This invention recognizes the advantages which have been cited by the prior art for the use of particulate heating/cooling agents. It goes beyond that prior art by addressing and resolving problem areas which have existed relative to the delivery of dry heat. More specifically, it does so by deliberately and systematically minimizing the presence and delivery of moisture in the course of heat application.

The particulate agents of this invention employ hydrophobic substances as payloads for heat storage enhancement. Because such substances are not apt to attract or contain moisture, they inherently tend to deliver dry heat only. Among the substances available for this purpose, roughly in order of decreasing microwave susceptibility, are acetylated monoglycerides, monoglycerides, edible fats and oil, paraffins, paraffin oils and mineral oils. All of the above are non-toxic and most are either pharmaceutical-grade or food-grade substances. Some, such as monoglycerides and paraffins, are solid at room temperature. Therefore, they must be melted for absorption into a carrier substrate. Of the options remaining, minerals oils or paraffin oils are clearly preferred for this purpose by virtue of their remarkable chemical stability, while other are subject to decomposition and oxidation under repeated heat cycling.

Because the preferred payload, mineral oil, is substantially microwave transparent, the choice of substrate becomes an important matter. Not only must the substrate be low in moisture and readily absorbent to a hydrophobic liquid such as mineral oil, it must also be microwave susceptible. Otherwise the particles would not be responsive to and heatable by microwave energy.

Conventional substrates such as catalyst carrier aluminas are not suitable for this purpose for reasons already enumerated. For later referfence, let us denote them as substrate A. What we need is a substrate which is readily absorbent to hydrophobic liquids such as mineral oils and at the same time minimally attractive to moisture. The latter will assure that the substrate per se does not contribute moisture to the heating function. It so happens that intensive thermal treatment of Type A substrate can in fact produce a substrate with the properties desired. To make the distinction clear, we shall refer to it as substrate B.

Aluminum Corporation of America makers of Type A substrates have, at our behest, produced test quantities of Type B substrates by a thermal treatment. We have used such substrates extensively in the development of this invention. Information provided by ALCOA indicates that Type B substrates typically differs from Type A in the nature of their porous structure and related properties, as follows:

|  | Type A | Type B |
| --- | --- | --- |
| Particle size, Tyler | 7–14 mesh | 7–14 mesh |
| Bulk density lbs/ft$^3$ | 38.5 | 35.0 |
| Particle density lbs/ft$^3$ | 64.2 | 58.3 |
| Specific surface m$^2$/gm | 330 | 107 |
| Mesoporosity, cc/gm 30–750 angstrom pores | 0.18 | 0.36 |
| Macroporosity, cc/gm 750 angstrom pores | 0.33 | 0.45 |
| Total porosity, cc/gm | 0.51 | 0.81 |
| Avg. Pore Diameter, angstrom (calculated) | 62 | 303 |
| Static Moisture Sorption, % at 58% RH | 19.5 | 5.0 |

It is evident that the properties of Type B substrate, notably its extra porosity and its diminished affinity for moisture, are credible measures of the attributes desired for this invention. Substrates having a total porosity greater than 0.6 cc/gram and specific surface area smaller than 200 m$^2$/gram are uniquely suited to the hydrophobic payloads of this invention.

Turning now to the drawings, FIG. 1 shows a substrate particle 10 with uniform or continuous porosity. The particle holds a diffusely absorbed liquid payload 11 by capillary action. It also shows some unfilled absorption capacity which, for the purpose of illustration, is depicted as a liquid deficient outer shell 12. FIG. 2 shows a similar particle 20, with variable or discontinuous porosity. Part of payload 21 is shown contained in that particle inside an enlarged, chamber-like cavity 22. Generically speaking, cavity 22 also represents the sum total of many random-sized vacuoles which are typically present in increasingly macroporous structures. Headspace 23, not filled with liquid, is once again indicative of deliberate liquid insufficiency. As a general rule, it is prudent to restrict the amount of liquid relative to substrate, so that differences in thermal expansion between the materials do not result in the expulsion of liquid out of its substrate with changes in temperature.

To accommodate hydrophobic payloads which are relatively or substantially microwave transparent, it is clearly desirable to make the ideal substrate microwave responsive. Solids owe their microwave properties to their chemical and/or ionic structure. However, to the best of our knowledge, microwave susceptibility is not normally a matter of concern in the manufacture of catalyst carriers. The incidence of such properties does not seem to be either predictable or controllable at present.

In searching for microwave responsive substrates it is best to simulate the conditions under which they are to be used. Briefly, this consists of loading a fixed weight of substrate with a fixed weight of payload, subjecting the mass to a dose of microwave energy, and then noting its temperature peak and subsequent cooldown. All this is done under replicable conditions, with the only variable being the substrate tested.

By means of such testing we have discovered two random substrates which are microwave responsive. One is Type A and the other Type B, both made by ALCOA. Thus, while most substrates are relatively microwave transparent (denotable as MWT), some substrates happen to be microwave responsive (denotable as MWR). Of the four options possible, i.e. substrates A/MWT, A/MWR, B/MWT and B/MWR, we clearly prefer the last. Substrate B/MWR possesses all of the attributes desired for this invention. It has high absorbency for hydrophobic payloads, low affinity for moisture and, most importantly, microwave responsiveness. This and other aspects of the invention will become more evident from a series of experiment performed in the course of its development.

Methods used in searching for the desired substrates can also be used to demonstrate the essence of this invention. A series of such experiments compares the performance of various substrates under well-controlled, replicable conditions. The substrates under comparison, typically spherical particles about 1/16–1/8" in diameter, are all derived from aluminum-based catalyst carriers. One hundred grams of each substrate were loaded with sixty grams of a hydrophobic payload. The particles were then transferred to thermally insulated cups and microwaved, covered, for a prescribed period at a fixed power level. Immediately after microwaving, a thermometer probe was inserted through the cover into the core of the particulate aggregate. Temperature was then observed and recorded until the core reached about 140 ° F., and end-point chosen arbitrarily for purposes of comparison.

The results of these tests are shown graphically in FIG. 3 with the following combinations of materials.

| Combination | Substrate | Payload | MW Time |
|---|---|---|---|
| I | B/MWT | Monoglyceride | 1.5 min. |
| (Ia) | (A/MWR) | (Monoglyceride) | (1.5 min.) |
| II | B/MWT | Mineral Oil | 3.0 min. |
| III | A/MWR | Mineral Oil | 2.0 min. |
| IV | B/MWR | Mineral Oil | 2.5 min. |

As expected, the above hydrophobic payloads were extremely slow to absorb into Type A substrates even with the latter carefully predried and substantially free of adsorbed moisture. Monoglycerides, with a melting point of 158 ° F., had to be melted prior to their absorption into the substrates. Results obtained under combination Ia, not shown graphically but referred to in the table within parentheses, were not discernibly different from those of Combination I. That clearly demonstrates that for moderately microwave responsive payloads such as monoglycerides it makes no difference whether the substrate is microwave responsive or not.

Of the results shown graphically, it is important to note the following:

1. Microwave transparent substrate, type B/MWT, depends on the moderate microwave susceptibility of the payload to perform as it does in graph I. Note, however, what happens in graph II when the moderately responsive payload, monoglyceride, is replaced by a transparent payload such as mineral oil. That combination is practically ineffective even after doubling microwave time.
2. Microwave responsiveness is restored almost fully by matching the transparent payload, mineral oil, with microwave responsive substrates such as A/MWR or B/MWR. Note that graphs III and IV closely approximate the performance of graph I, albeit with additional microwave time. More responsive substrates, when available, will probably require less time.

The particulate agents of this invention are well suited for therapeutic dry heat applications. A limb, body part, or extremity may, for example, be immersed directly into an aggregate of preheated particles which are held in an open container. The particles may also be contained in a flexible bag made of fabric, much like a bean bag, and then be used in that fashion. The bag may in fact be designed, sized and shaped to readily fit around specific parts of the body.

The same technology may also be used to add a desirable fragrance along with the application of heat. Heat applications to children may be accompanied by a fragrance suggestive of baby oil, baby powder and the like. Heat applications to adults may, similarly, be enhanced by fragrances suggestive of cleanliness, wholesomeness, medication or anything that will make for a more pleasurable experience. To achieve such objectives, an oil-soluble fragrance component may simply be included in the hydrophobic payload of the particles. The fragrance component may be present uniformly in each and every particle, or be limited to a select proportion of the particles which is evenly distributed in an otherwise non-fragrant aggregate.

Primary consideration has thus far been given to applications of sequential heating; i.e. those entailing heat generation in the microwave and later delivery of stored heat to a load object outside the microwave. However, with the property of fluidity, particulate solids of this invention may be used as sources of heat inside the microwave. Any object which is inherently microwave transparent can be immersed in a bed of such solids and be heated by them while the combination is undergoing microwaving.

The foregoing description is for the purpose of teaching the person of ordinary skill in the art how to practice the present invention. It is not intended to detail all of those obvious variations and alternatives which will become apparent to the skilled practioner upon reading the description. It is intended, however, that all such variations and alternatives be included within the scope of the present invention which is defined by the following claims.

I claim:

1. Particulate agents for dry heat application comprising:

a) a solid substrate derived via intensive thermal treatment an alumina-based adsorbent and catalyst carrier which is relatively microwave transparent and microporous, with a total porosity greater than 0.6 cc/gram and a specific surface area smaller than 200 $m^2$/gram; and b) a hydrophobic substance, absorbed in said substrate, which is moderately microwave transparent, said substance comprising at least one major, non-volatile component.

2. The particulate agents of claim 1 wherein the hydrophobic substance includes a component selected from the group consisting of monoglycerides and other fatty acid esters of polyhydric alcohols.

3. Particulate agents for dry heat application comprising:

a) a solid substrate derived via intensive thermal treatment an alumina-based adsorbent and catalyst carrier which is relatively microwave transparent and microporous, with a total porosity greater than 0.6 cc/gram and a specific surface area smaller than 200 $m^2$/gram; and b) a hydrophobic substance, absorbed in said substrate, which is substantially microwave transparent, said substance comprising at least one major, non-volatile component.

4. The particulate agents of claim 3 wherein the hydrophobic substance includes a component selected from the group consisting of edible fats and oils.

5. The particulate agents of claim 3 wherein the hydrophobic substance includes a component selected from the group consisting of paraffins, paraffin oils and mineral oils.

6. The particulate agents of claim 3 wherein the hydrophobic substance further comprises a volatile fragrant additive for delivery of a desirable fragrance along with the delivery of heat.

* * * * *

UNITED STATES PATENT AND TRADEMARK OFFICE
CERTIFICATE OF CORRECTION

PATENT NO : 5,560,856

DATED : October 1, 1996

INVENTOR(S): Reuven Dobry

It is certified that error appears in the above-identified patent and that said Letters Patent are hereby corrected as shown below:

| Column | Line | Delete | Insert |
|--------|------|--------|--------|
| 8 | 12 | "microporous" | --macroporous-- |
| 8 | 27 | "relatively" | --substantially-- |
| 8 | 27 | "transparent" | --responsive-- |
| 8 | 27 | "microporous" | --macroporous--. |

Signed and Sealed this

Twentieth Day of October, 1998

Attest:

BRUCE LEHMAN

Attesting Officer

Commissioner of Patents and Trademarks